Patented Aug. 21, 1928.

1,681,904

UNITED STATES PATENT OFFICE.

PLINY P. PIPES, OF MANSFIELD, OHIO, ASSIGNOR TO THE OHIO BRASS COMPANY, OF MANSFIELD, OHIO, A CORPORATION OF NEW JERSEY.

WELDING ROD.

No Drawing.      Application filed March 18, 1927.   Serial No. 176,583.

This invention relates to the art of welding and particularly to the method and means of uniting copper to steel, as in the application of rail bonds to steel rails.

One of the objects of my invention is to provide a method of uniting rail bonds to steel rails in which the rail bond is composed of a copper conductor and may be provided with a ferrous terminal and the terminal and conductor so positioned and related to each other that the same may be applied to a rail by means of added welding metal, which can be fused to the conductor, the terminal and the steel rail, thereby uniting each to the other through the medium of welding metal.

Bonds of the class described and a method of applying are shown and described in detail in United States Letters Patent 1,029,742, dated December 26, 1916, and 1,297,381, dated March 18, 1919.

Another object of my invention is to provide a welding metal in the form of a filling rod or electrode, which can be used in uniting the bond to the rail, and in which the resulting weld or union between the welding metal and the parts to which it is applied will be a substantially molecular formation, free from impurities, and in which the deposited metal will be of fine grain or structure and of high shearing strength.

In experimenting with the application of rail bonds to rails by welding, and especially where the welding metal is of copper, I find that pure commercial copper does not produce good results, in that it does not seem to work or flow as well as desired under the action of the electric arc or the oxy-acetylene flame, which are usually used in applying bonds to rails. At the same time, the union between the deposited copper and the steel of the rail or with the bond terminal, or with the copper conductor of the bond is not all to be desired to give the highest efficiency electrically and mechanically, and I also find that the deposited metal itself is more or less porous, of a spongy nature and of considerably reduced mechanical strength.

These faults seem to be due largely to the formation of oxides and gases during the welding operation, and these gases and oxides retained in the deposited metal upon cooling.

To overcome these difficulties, I find that it is possible to produce a filling rod or electrode which will practically eliminate the difficulties mentioned, and which can be applied by either the electric arc or the oxy-acetylene flame in the welding operation.

Copper rods for this purpose has been produced in the past which contain manganese, magnesium, silicon, boron and other similar materials, but apparently very little consideration has been given to such a rod containing phosphorus in combination with other materials and in the right proportions, whereby the rod will give the desired results and which can be used for welding, with equally good results by such heating flames as the electric arc and oxy-acetylene.

Tests which I have carried on indicate that phosphorus uniformly incorporated in a rod is a very good and powerful deoxidizer, and permits of a deposited metal, which is homogeneous and fine grained, and in which the union with the steel, iron or other metal to which it is applied gives a molecular union of a very homogeneous character, free from interposed scale or slag, and I find for such purpose that a phosphorus content of from 0.10% to 0.30% is sufficient for the deoxidization and degasifying of the deposited metal, but with such rod, I find that the fused metal is of a very fluid character and quite hard to control and is difficult to build up.

Through tests and experiments I find that with a copper phosphorus rod, as described above, the addition thereto of tin between proper limits will not only correct the fluid condition, that is, reduce the same, but will very materially add to the metchanical strength of the deposited metal, and I find that tin added to the amount of 0.50% to 1.00% will give the results I desire.

I also find that with the higher percentage of tin given in the above limits a lower percentage of phosphorus is sufficient and vice versa, in so far as the same affects the deoxidization and the degasifying of the deposited metal, but that with the higher percentage of tin present, the deposited metal is of a higher mechanical strength.

For practical use, I find that a rod of pure commercial copper, containing 0.75% tin and 0.15% phosphorus, will give excellent results, both under action of the electric arc and the oxy-acetylene flames.

There are proportions, I have found, of phosphorus and tin, which, when combined with copper, would be suitable for welding under the oxy-acetylene flame, but not under the action of the electric arc or flame and other proportions which could be used under the electric arc, but not under the action of the oxy-acetylene flame.

The rod or electrode produced as above, in which the tin and phosphorus are uniformly incorporated and distributed will give a union and a deposit of metal which is substantially free from blow holes, and in which occluded gases are substantially eliminated, and in which the oxides are substantially destroyed. The deoxidizing elements are of such proportion that they are materially reduced in the finished weld, and especially is this true of the phosphorus, which is substantially eliminated.

The amount of phosphorus, however, must be sufficient to perform its deoxidizing function, but, in itself, adds nothing to the strength of the metal as does the tin.

Having described my invention, I claim:

1. A copper welding rod containing phosphorus between the limits of about 0.10% and 0.20% and tin between the limits of about 0.50% and 1.00%.

2. A copper welding rod containing phosphorus of about 0.12 and tin of about 0.75%.

In testimony whereof I affix my signature.

PLINY P. PIPES.